(No Model.)

M. HOLDEN.
FLOWER POT.

No. 289,102. Patented Nov. 27, 1883.

Attest
Charles R. Harris
Frank Craven

Inventor
Magdalene Holden

N. PETERS, Photo-Lithographer, Washington, D. C.

UNITED STATES PATENT OFFICE.

MAGDALENE HOLDEN, OF PHILADELPHIA, PENNSYLVANIA.

FLOWER-POT.

SPECIFICATION forming part of Letters Patent No. 289,102, dated November 27, 1883.

Application filed June 8, 1883. (No model.)

*To all whom it may concern:*

Be it known that I, MAGDALENE HOLDEN, of the city of Philadelphia, county of Philadelphia, and State of Pennsylvania, have invented an Improvement in Flower-Pots, of which the following is a specification.

My invention has reference to flower-pots; and it consists in forming the same with a closed bottom, and one or more receptacles or passages formed upon the same, extending from the top to the bottom, where they open into the interior of a flower-pot, and in details of construction, fully set forth in the following specification, and shown in the accompanying drawings, which form part thereof.

I form a flower-pot with passages for conducting the water from the top to the bottom of the pot, offset upon the exterior thereof. Heretofore such passages have been formed on the inside of the pot, or by an annular opening surrounding the entire pot. I lay no claim to such forms.

Figure 1:
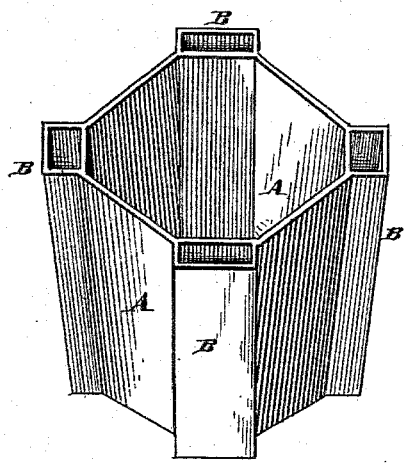
Figure 2:
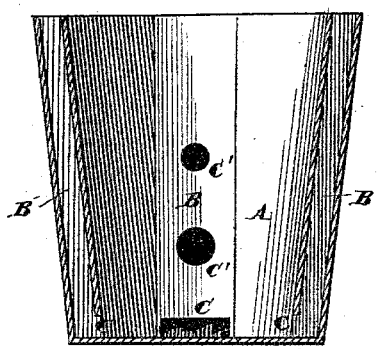
Figure 4:
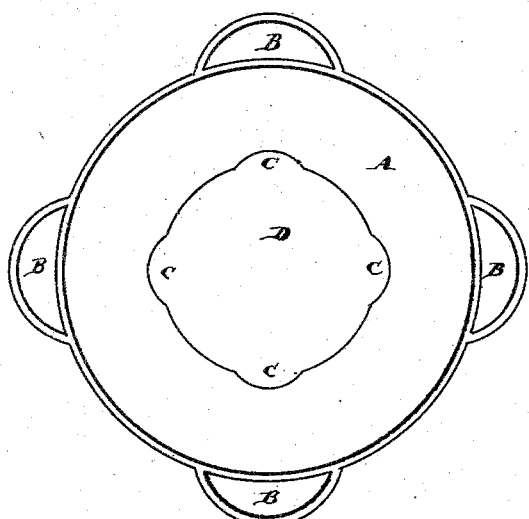
Figure 3:
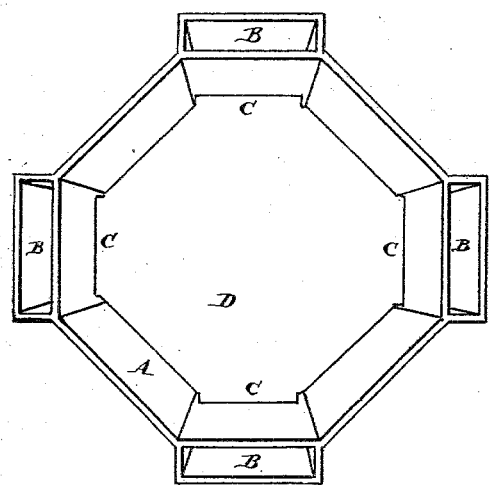

In the drawings, Figure 1 is a perspective view of the flower-pot embodying my invention. Fig. 2 is a sectional view of same on line $x\,x$. Fig. 3 is a plan view of same. Fig. 4 is a plan view of same modified in its configuration.

A is the body of the flower-pot, and may be square, rectangular, hexagonal, octagonal, elliptical, or round, and is provided with a solid bottom, D. In elevation the pot may be tapering or prismatical. The body is provided with one or more offset passage-ways or receptacles, B, which are open at the top, and connect with the interior of the pot, at or near the bottom, by passages or apertures C. If desired, additional apertures C' may be made in the walls of the pot, to open into the passages B at various heights.

I do not limit myself to any particular shape or ornamentation of my improved flower-pot. Neither do I limit myself to any particular substance from which it shall be made, but I prefer, on account of cheapness, the usual terra-cotta. It may be made, however, of sheet metal.

Having now described my invention, what I claim as new, and desire to secure by Letters Patent, is—

A flower-pot having a plane interior, and offset passages or receptacles formed on the exterior thereof, extending from the top to the bottom of the pot, and provided with apertures connecting the receptacles with the interior of the pot, substantially as set forth.

In testimony of which invention I hereunto set my hand.

MAGDALENE HOLDEN.

Witnesses:
CHARLES R. HARRIS,
FRANK CRAVEN.